United States Patent [19]
Shaw

[11] 3,980,484
[45] Sept. 14, 1976

[54] FIBER REINFORCED STRUCTURAL MATERIAL AND METHOD OF MANUFACTURE

[75] Inventor: Terrence M. Shaw, Columbus, Ind.

[73] Assignee: Edward C. Levy Company, Detroit, Mich.

[22] Filed: Feb. 28, 1975

[21] Appl. No.: 554,162

[52] U.S. Cl. .................... 106/90; 106/99; 260/42.19; 260/34.2; 404/17
[51] Int. Cl.² .................. C04B 7/02; C04B 7/35
[58] Field of Search .............. 260/42.17, 895, 34.2, 260/42.18, 42.19; 106/90, 99, 288

[56] References Cited
UNITED STATES PATENTS

| | | |
|---|---|---|
| 3,642,955 | 2/1972 | O'Connor .................. 260/42.21 |
| 3,650,785 | 3/1972 | Ball et al. .................. 106/90 |
| 3,681,280 | 8/1972 | Beghelli .................. 260/42.21 |
| 3,769,052 | 1/1973 | Kurtz .................. 106/111 |

*Primary Examiner*—Lewis T. Jacobs
*Assistant Examiner*—William Parker
*Attorney, Agent, or Firm*—Harness, Dicky & Pierce

[57] ABSTRACT

A formable matrix used as structural material and having an admixture of reinforcing non-metallic meltable fibers. The fibers have enlarged knob-like ends serving as anchors to enhance the bonding action between the fiber and the matrix. The admixture reduces freeze-thaw losses and improves flexural strength of the matrix. Several methods of forming the fiber end knobs are disclosed.

9 Claims, 4 Drawing Figures

FIBER REINFORCED STRUCTURAL MATERIAL AND METHOD OF MANUFACTURE

BACKGROUND OF THE INVENTION

1. Field of the Invention

The invention is concerned with the non-metallic fiber reinforcement of formable matrices used as structural material, such as concrete, plaster and sand-lime mixtures, and also to organic thermosetting type plastics and resins. The invention is particularly concerned with controlling the deterioration of such structural materials by alternate freezing and thawing, as well as improvement in flexural strength, namely in tension.

2. Description of the Prior Art

A relative weakness of certain hydraulic setting matrices used as structural materials, and also of organic thermosetting type plastics and resins, is well known. For example, concrete is strong in compression, but relatively weak in tension, and therefore in flexure. It is common for this reason to use steel reinforcement in concrete, and pre-stressing or post-stressing of the steel places the concrete in compression to counteract the flexural or tension loading.

Freeze-thaw cycles cause disruption of concrete for the same reason. Freezing of minute particles of ice inside the concrete cause tensile forces which are in excess of the ability to withstand them, causing portions (near the surface particularly) to spall.

It is known to admix fibers with the matrix to counteract these drawbacks. Among disclosures of steel or wire admixed fibers are the following:

| Romualdi | Patent No. 3,429,094 |
| Ball et al | Patent No. 3,650,785 |
| National Standard Co., Technical Data Bulletin No. SWT-114, September, 1970. | |

The use of wire or steel fibers is unsatisfactory for several reasons. Steel has low elongation even at high tensile stresses and the fibers are likely to slip within the matrix when the structural member is subjected to loads. In addition to the relative stiffness and lack of workability of steel, it is relatively heavy and therefore costly to achieve a given proportionate volume within the matrix.

The use of non-metallic fibers admixed in matrices for strengthening purposes is equally well known. Examples of patents disclosing such compositions are the following:

| Jarboe | Patent No. 3,044,547 |
| Shannon | Patent No. 3,147,127 |
| Fischer et al | Patent No. 3,533,203 |
| Zonsveld | Patent No. 3,591,395 |
| Goldfein | Patent No. 3,645,961 |
| Howe | Patent No. 3,679,445 |
| Kempster | Patent No. 3,716,386 |
| Kurtz | Patent No. 3,769,052 |

A characteristic of these fibers which creates a drawback is that under stress they begin to stretch, and in stretching their diameter shrinks. By shrinking, the fibers may lose their bond with respect to the matrix. This sequence causes rapid progressive failure when the yield strength of the composite fiber-matrix mixture is reached.

The same would be true of conventional reinforcing rod, except that it is preformed before use to provide mechanical connections with the matrix that persist regardless of shrinkage in cross section. This is not possible with extruded fibers which are merely cut off clean. A deformed fiber, such as some of the available metal ones or others see National-Standard Co. Specification No. SWT-114 and Howe U.S. Pat. No. 3,679,445) which have intermittent flattened or twisted sections, or crimped, hammered or tapered profiles, does not counteract this drawback. Other patents in this same general area discovered while conducting searches on the subject matter of this invention are the following:

| Fischer et al | Patent No. 3,208,838 |
| Kjell-Berger | Patent No. 3,217,075 |
| Hull et al | Patent No. 3,466,822 |
| Gothard et al | Patent No. 3,637,457 |
| Campbell | Patent No. 3,676,968 |

BRIEF SUMMARY OF THE INVENTION

It is an object of the present invention to overcome the disadvantages of the previous fiber-matrix compositions described above, and to provide a material which combines the advantages of low-cost and high-elongation fibers with a firm bonding of the fibers to the matrix, whereby the flexural strength and freeze-thaw characteristics of the resulting structure will be greatly enhanced.

It is another object of provide a method of manufacturing such structural material which is economical, efficient and well-suited to mass production.

Briefly, the structural material of this invention comprises a hardenable matrix chosen from the group consisting of hydraulic-setting matrices and organic thermosetting type plastics and resins, and a plurality of randomly arranged fibers admixed in said matrix, said fibers being fabricated of a non-metallic substance, the major portions of said fibers being of constant thickness, the opposite ends of such fibers having knobs formed thereon, the average thickness of said knobs being at least ten percent greater than said constant thickness, whereby said knobs will serve to anchor the ends of each fiber in the matrix.

The method of the present invention for forming a structural material comprises the steps of forming a hardenable matrix chosen from the group consisting of hydraulic-setting matrices and organic thermosetting type plastics and resins, forming a plurality of fibers fabricated of a non-metallic meltable substance, the major portions of said fibers being of constant thickness, heat-forming the opposite ends of each fiber so as to create knobs, the average thickness of said knobs being at least ten percent greater than said constant thickness, randomly admixing said knob-ended fibers in said matrix, and permitting the matrix to harden, whereby said knobs will serve to anchor the ends of each fiber in the matrix.

DESCRIPTION OF THE PREFERRED EMBODIMENTS

Figure 1:
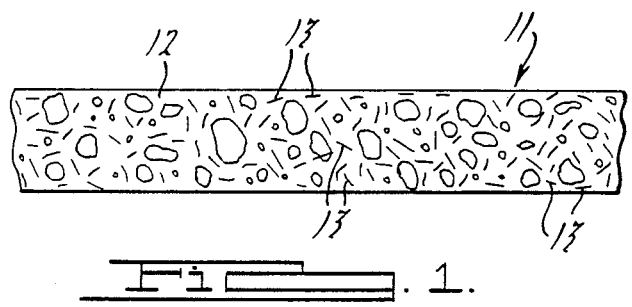
FIG. 1 is a side-elevational view of a structural member formed in accordance with the invention.

Referring to FIG. 1, the structural material of this invention is generally indicated at 11 and comprises a formable and hardenable matrix 12 and a plurality of randomly admixed fibers 13. The matrix is shown in FIG. 1 as being concrete but the invention applies equally well to other hydraulic-setting matrices such as plaster and sand-lime mixtures, and could also apply to organic thermosetting type plastics and resins.

Reinforcing fibers 13 may be fabricated of a polymer or other non-metallic meltable substance. For use in concrete as a matrix, preferable materials are nylon and polypropylene which have resistance to the alkaline environment. Other substances which may be used to fabricate fibers 13 are polycarbonate, acetate, rayon, acrylic fiber, fiberglass, polyethylene, polyolefin, polyvinylidene chloride, and polyester.

The lengths of fibers 13 may be varied to suit requirements, typical lengths being one or two inches. The fiber thickness may be in the neighborhood of 8 to 20 thousandths of an inch. The proportion of fibers to matrix is such as to obtain the desired strength characteristics, taking into account cost considerations. A typical fiber concentration would be two percent by volume in a concrete matrix. The fibers are admixed in the unset matrix by proper techniques which will prevent clumping or clinging or the fibers and insure a uniform random admixture through the entire matrix.

Figure 2:
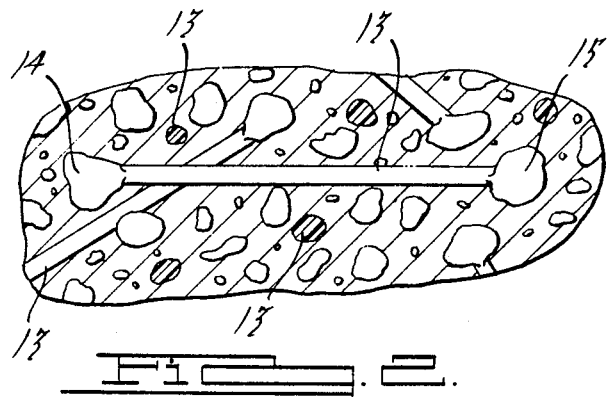
FIG. 2 is an enlarged fragmentary cross-sectional view showing the manner in which the knob-like fiber ends anchor the fibers in the matrix, which in this case is concrete.

A typical construction of each fiber 13 is seen in FIG. 2. The major portion of the fiber is of constant thickness, but a pair of knobs 14 and 15 are formed at its opposite ends. The knobs are substantially greater in thickness than the major portion of the fiber, being at least ten percent and preferably about fifty percent greater.

The presence of knobs 14 and 15 will serve to anchor the ends of each fiber 13 in the matrix. Thus, any shrinkage of the main fiber thickness when it is stretched under load will not result in a loss of bond between the fiber ends and the matrix. The elongation and tensile strength properties of the fiber material will improve the flexural strength and freeze-thaw resistance properties of the composition.

If desired, the fibers may be pre-stretched before they are admixed into the matrix. This will in some cases improve the compressive effect of the fibers on the matrix and further improve the flexural and freeze-thaw resistance properties.

Another optional step is to heat the matrix after it has set sufficiently to obtain some strength, the heating being such as to cause the shrinkage tendency of the fibers to stress the matrix into a moderate further degree of compression. As a typical example, the matrix and admixed fibers may be allowed to set for twenty-four hours and then heated to equilibrium at between 150°F and 350°F, depending upon the matrix and fiber materials as well as other pertinent factors.

An example of the use of this invention is for pavement overlays, covering existing cracks. In such overlays, a tension problem is created by freezing and thawing of water. The present invention is believed to enhance the strength characteristics of overlays used for this purpose.

The end knobs of fibers 13 may be formed by melting the fiber ends under controlled conditions. Among the methods which may be used to create the knobs are the following:

1. flame cutting or hot-knife cutting of the extruded fibers. This method is slow because the fibers must be cut to length individually to avoid melting together in bunches.

Figure 3:
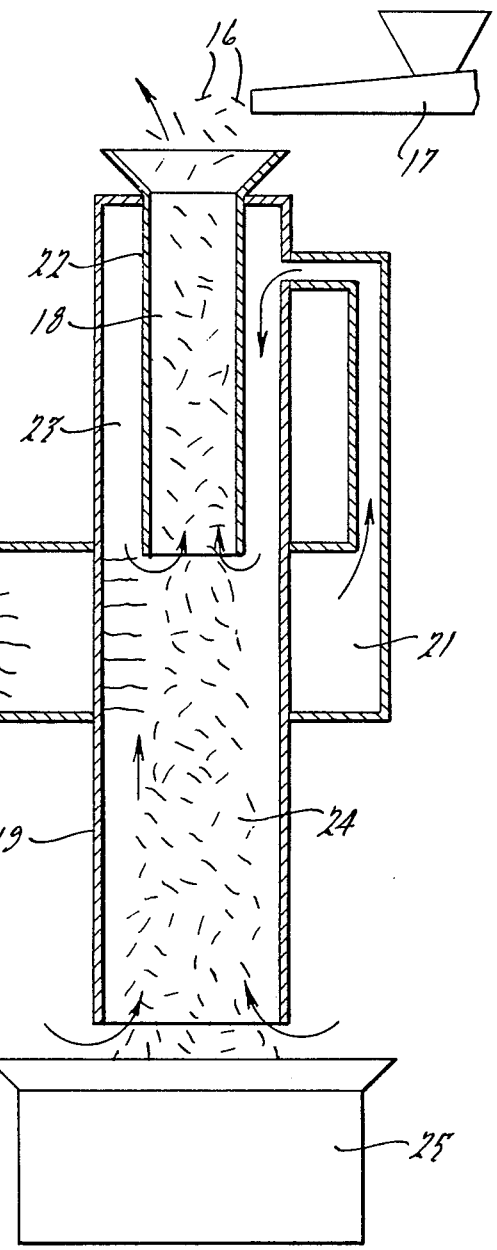
FIG. 3 is a schematic view showing a preferred method of manufacturing the fibers.
Figure 4:
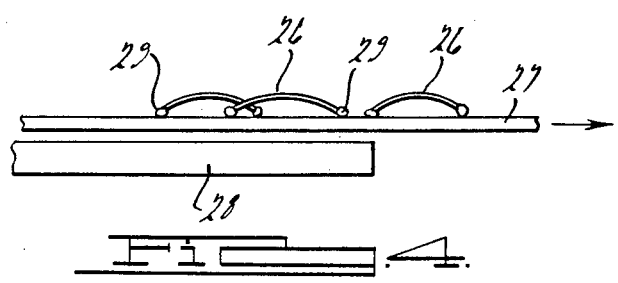
FIG. 4 is a schematic view of another method of manufacturing the fibers.

1. Gravity fall through hot air. This method is illustrated in FIG. 3. The knife-cut fibers 16 are fed by a vibrating feeder 17 into a rising column 18 of hot air. This column may be created in a steel tube 19 by a heater 21 surrounding its midsection. An inner tube 22 in the upper portion of tube 19 receives the fibers; this inner tube may be preheated by hot air fed into the annular space 23 between the tubes from heater 21, this air then rising through tube 22.

The hot air temperature may be varied to suit requirements. For 0.010 inch thickness polypropylene, for example, a 600°F hot air temperature in a fall of about four feet was found appropriate, but a combination of lower temperature and longer time would also be effective.

The exposure to heat causes the entire fiber to soften, but the ends soften the greatest amount, allowing surface tension effects to form a somewhat spherically-shaped knob at each end. The fibers are permitted to fall through cooler air 24 in the lower section of tube 19 which is drawn in by convection from the bottom. The knobs will solidify and the fibers will not stick together. They may be collected in a container 25.

3. Polymer fibers 26 (FIG. 44) may rest on a conductive surface 27, for example a metal belt conveyor which is gradually heated by a source 28. The side of each fiber facing the conductive surface will shrink, causing the fiber to curl and arch upwards away from the surface. This will bring the ends in contact with the hot conductive surface, and they will receive a greater amount of heat. With proper control of the time-temperature relationship, the ends will partially melt and become enlarged or deformed.

Representative Concrete Tests

| | | 2% by Volume Polypropylene Fiber | |
|---|---|---|---|
| | Standard Concrete | Plain Ends | Flame-Cut Knob-Ends |
| I. Ultimate Strength (28 day flexural) | 1444 psi | 1719 psi | 2936 psi |
| II. Accelerated Freeze-Thaw Cycle Tests | | | |
| (a) 10 cycle loss by weight | 65.1% | 73.4%* | 22.6% |

-continued

| Representative Concrete Tests | | | |
|---|---|---|---|
| | Standard Concrete | 2% by Volume Polypropylene Fiber | |
| | | Plain Ends | Flame-Cut Knob-Ends |
| (b) Cycles to total destruction | 12 ½ | 14 | 22 |

*Average of two identical specimens - statistically too broad a range to be reliable.

The 28 day flexural ultimate strengths were obtained as follows:

Concrete materials were mixed in a laboratory Hobart mixer. Fibers, where used, were then sprinkled in slowly and mixed in by hand stirring with a spoon.

| The mix was: | |
|---|---|
| Water | 650 gm |
| Type I cement | 1125 gm |
| Sand | 1800 gm |
| Gravel, ⅜" × ¼" | 2700 gm |
| Fibers (2% by volume) | |

The concrete mix was hand placed in 2 × 2 × 12 inches steel molds in two layers, compacting each layer by hand with a standard hard rubber tamper, cured at 70°F, 100% R.H. for 24 hours, stripped from the molds, cured an additional 27 days, and broken in flexure per ASTM C-293.

The 2 × 2 × 2 inches freeze-thaw test specimens were saw cut from the ends of the same flexural test prisms. The freeze-thaw durability tests were run by alternately freezing in saline solution and thawing in the same solution. After each five cycles the loose concrete was removed.

The fibers were approximately 2 inches long and had a thickness of 0.010 inch. The size of the knobs on the fibers averaged 0.0135 inch thickness with a range of 0.012 to 0.015 inch.

I claim:

1. A structural material comprising a hardenable matrix, and a plurality of randomly arranged fibers admixed in said matrix, said fibers being fabricated of a non-metallic substance, the major portions of said fibers being of constant thickness, the opposite ends of such fiber having knobs formed thereon, the average thickness of said knobs being at least ten percent greater than said constant thickness, whereby said knobs will serve to anchor the ends of each fiber in the matrix.

2. A structural material according to claim 1 in which said fibers are fabricated of a material chosen from the group consisting of polycarbonate, acetate, rayon, acrylic fiber, fiberglass, polyester, polyethylene, polyolefin, and polyvinylidene chloride.

3. A structural material according to claim 1, said matrix being concrete, said fibers being fabricated of a material chosen from the group consisting of nylon and polypropylene.

4. A structural material according to claim 1, the thickness of said fiber knobs being at least ten percent greater than the thickness of said main fiber portions.

5. A method for forming a structural material comprising the steps forming a hardenable matrix chosen from the group consisting of hydraulic-setting matrices and organic thermosetting-type plastics and resins, forming a plurality of fibers fabricated of a non-metallic meltable substance, the major portions of said fibers being of constant thickness, heat forming the opposite ends of each fiber so as to create knobs, the average thickness of said knobs being at least ten percent greater than said constant thickness, randomly admixing said knob-ended fibers in said matrix, and permitting the matrix to harden, whereby said knobs will serve to anchor the ends of each fiber in the matrix.

6. The method according to claim 5, further provided with the step of stretching said fibers before they are admixed in said matrix, whereby the compressive effect of the admixed fibers in the hardened matrix will be increased.

7. The method according to claim 5, further provided with the step of heating the matrix after it has set sufficiently to obtain some strength, the heating being such as to cause the shrinkage tendency of the fibers to stress the matrix into a further degree of compression.

8. The method according to claim 5, in which said thickened fiber ends are formed by cutting the fibers to proper length, and permitting them to fall by gravity through hot air, the hot air temperature and falling time being such that the fiber ends will partially melt to allow surface tension effects to form end knobs, and permitting the fibers to further fall through cooler air so that the knobs will solidify.

9. The method according to claim 5, in which said thickened fiber ends are formed by cutting the fibers to proper lengths, resting the fibers on a conductive surface, and heating said surface so as to cause the fibers to shrink, curl and arch upwardly away from the surface bringing the fiber ends in contact with the surface, whereby the ends will partially melt and become enlarged or deformed.

* * * * *